United States Patent Office 3,076,016
Patented Jan. 29, 1963

3,076,016
METHOD OF POLYMERIZING ACETYLENE AND CERTAIN SUBSTITUTED ACETYLENES USING A NICKEL COMPLEX COMPOUND AND PRODUCTS PRODUCED THEREBY
Joseph R. Leto and Marilyn L. Fiene, Stamford, Conn., assignors to American Cyanamid Company, Stamford, Conn., a corporation of Maine
No Drawing. Filed Mar. 25, 1960, Ser. No. 17,493
10 Claims. (Cl. 260—468)

This invention relates to catalytic polymerization of acetylene and certain substituted acetylenes. More particularly, this invention relates to the polymerization of these acetylenes through the use of tetra-coordinated, formally zerovalent nickel complexes having the general formula (I) $\quad Ni(B_pA_{1+p}X_nY_m)_{4-2p}$ wherein $p$ is an integer from 0 to 1, $n$ is an integer from 0 to 3, $m$ is an integer from 0 to 2; A represents a member selected from the class consisting of nitrogen, phosphorus, arsenic and antimony; X represents a member selected from the class of halogens and pseudohalogens consisting of fluorine, chlorine, bromine, iodine, cyanato, isocyanato, thiocyanato, cyano-, isocyano- and cyanato- derivatives; Y represents a members selected from the class consisting of alkyl, aryl, aralkyl, alkaryl, alkoxy, aryloxy, hydroxy, and halogen-substituted alkyl and aryl groups; B represents a divalent hydrocarbon radical bridging two atoms represented by A selected from the class consisting of alkyl, aralkyl, aryl, alkaryl and cycloalkyl radicals. New products from the polymerization (cyclotetramerization) of variously substituted esters of propiolic acid which products are represented by the following general formulae:

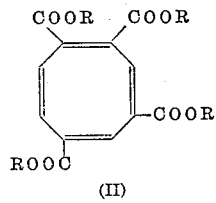

(II)

and

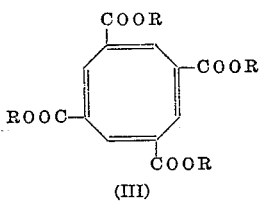

(III)

wherein R represents at least one member of the class of radicals consisting of alkyl, aryl, aralkyl, alkaryl, alkenyl, cycloalkyl, dialkylaminoalkyl and hydrogen.

This invention still further relates to the partially and totally hydrogenated products of the compounds represented by Formulae II and III and the acids and salts obtained by saponification thereof.

These tetrakis compounds are easily prepared (see e.g. Wilkinson and Irvine, Science, 113, 742 [1951], and Wilkinson, JACS, 73, 5501 [1951]; J. Chatt, Imperial Chemical Industries Report, ARL/543, July 1959; J. Chatt, Chemistry and Industry, 1958, p. 1474).

It was known prior to the present invention to polymerize acetylene, allene, and monosubstituted acetylenes. However, it was not known or suggested prior to the present invention that polymerizable materials including acetylene, allene, or the propiolates could be polymerized to new and useful polymers (homopolymers and copolymers) of the starting acetylenic compound with the aid of the particular catalyst which is used in practicing the instant invention.

The present invention is based on our discovery that a catalyst comprising a tetracoordinated, formally zerovalent complex compound of nickel is effective for use in the polymerization of acetylene, allene and the propiolates. More particularly, we have found that the aforesaid catalyst is effective while the said material, i.e., a polymerizable material including a compound selected from the class of acetylene, allene and the propiolates, is distributed throughout (e.g., dissolved and/or dispersed in) a liquid reaction medium and while the said material or compound is in reactive relationship with a catalyst comprising the said tetracoordinated nickel complexes. The primary advantages of the invention reside in the simplicity of the operation, in the availability and stability of the catalyst employed, and in the usefulness of the novel products obtained in such a reaction.

The tetracoordinated, formally zerovalent nickel complexes as represented by Formula I include two structurally different types of complexes. One type of complex exists with four independent coordinating groups while the other complex exists with two coordinating groups. The following formulae clearly illustrate this difference and are intended to more adequately define the catalyst systems represented by Formula I.

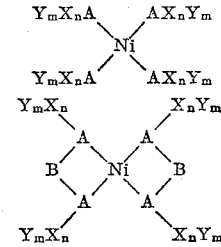

(IV)

(V)

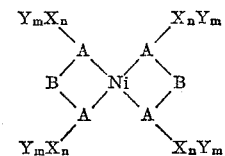

The symbols in the above formulae have the same meaning as designated for the symbols of Formula I; B represents a divalent radical bridging the two atoms represented by A; B is a bridging group of at least two carbon atoms. The maximum number of carbon atoms that can be bridged across the coordinating groups is four; however, this sets no limit on the total chain length of B.

Illustrative examples of compounds represented by Formula IV which are useful in practicing the present invention are: $Ni(PF_3)_4$, $Ni(PCl_3)_4$, $Ni(PBr_3)_4$, $Ni[P(C_6H_5)Cl_2]_4$, $Ni[AsCl_2CH_3]_4$, $Ni[Sb(C_2H_5)_2Br]_4$, $Ni[P(NCO)_2BR]_4$, $Ni(PCl_2CH_3)_4$, $Ni[P(OC_6H_5)Cl_2]_4$, $Ni[As(OC_2H_5)_2I]_4$, $Ni[N(C_6H_{11})_2Cl]_4$ etc.

Illustrative examples of compounds represented by Formula V which are useful in practicing the present invention are as follows:

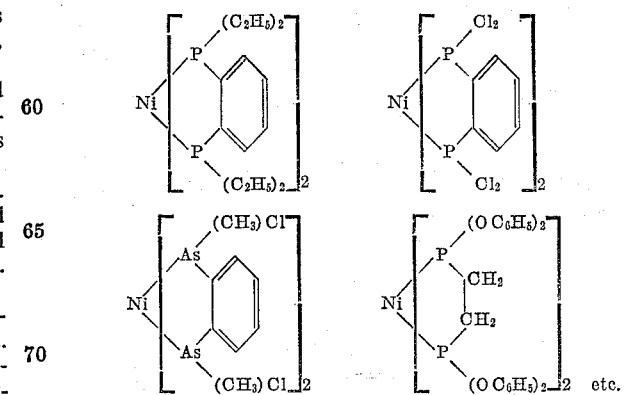

etc.

Other examples will be apparent to those skilled in the art from Formulae IV and V and the definitions and illustrative examples of ligands given in the portion of the specification following those formulae.

The chosen reaction medium is one which is substantially inert to the acetylenic compound, to the catalyst, and to the reaction product or products, more particularly to the polymeric reaction product.

Illustrative examples of solvents or diluents that may be used as the reaction medium are hydrocarbons, such as petroleum ether, cyclohexane, n-heptane, benzene, etc.

Acetylenic compounds of the kind described and defined hereinbefore, or any polymerizable material containing such a compound, can be polymerized while it is in a liquid reaction medium and is in reactive relationship with a catalyst comprising a compound of nickel as described and defined in Formula I.

The various propiolates which are polymerizable may be represented by the general formula:

(VI) 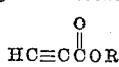

wherein R is selected from the class consisting of alkyl, aryl, aralkyl, alkaryl, alkenyl, dialkylaminoalkyl and cycloalkyl groups.

Illustrative examples of operable substituents for R include methyl through decyl, phenyl, naphthyl, tolyl, benzyl, cyclopentyl through cycloheptyl, vinyl, isopropenyl, allyl, phenylethyl, phenylpropyl, phenyl naphthyl, xylyl, ethyl phenyl, methyl- and dimethyl naphthyl, dimethyl- and diethylaminomethyl, dimethyl- and diethylaminoethyl, and other similar tertiary lower alkyl substituted amino radicals.

The specific names of some of the propiolate esters which are easily polymerized as herein described, either alone or with other copolymerizable materials, are methyl propiolate, ethyl propiolate, phenyl propiolate, vinyl propiolate, N,N-diethylaminomethyl propiolate, cyclohexyl propiolate, benzyl propiolate, allyl propiolate, etc.

The polymerization of the acetylenic compounds embraced by Formula VI to the tetrasubstituted cyclooctatetraenes represented in Formulae II and III in such a fashion as described in this specification is totally unexpected. These cyclooctatetraenes may be prepared by copolymerizing a mixture of different monomers, so that R in Formulae II and III may be varied on the same ring.

The polymers formed by the catalytic polymerization reactions of this invention are, for example, (1) homopolymeric acetylene, which is a yellow oil characterized by the presence of absorption bands in the infrared typical of a hydrocarbon polymer containing ethylenic and acetylenic unsaturations; (2) cyclic trimers and tetramers of allene, comprising various isomeric modifications of tri-exomethylenecyclohexane and tetra-exomethylene-cyclooctane; and (3) cyclic trimers and tetramers of the propiolate esters mentioned hereinbefore, comprising various isomeric modifications of trisubstituted benzene and tetrasubstituted cyclooctatetraene, including those cyclooctatetraenes referred to in Formulae II and III, which are characterized by the presence of absorptions in the infrared at 1628 and 795 cm.$^{-1}$. The cyclooctatetraene products referred to in this specification are colorless or light yellow to orange-colored solids or oils.

It is believed that the 1,2,5,6 and the 1,2,4,7 ester substituted cyclooctatetraenes are also formed by the present process but in very small amounts which are not easily detectable. The structure of these isomers is of a stable type and would not immediately decompose on formation. They have the following formulae:

(VII) 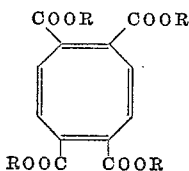

(VIII) 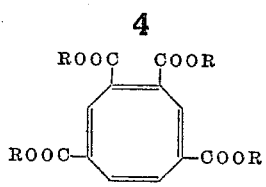

R is the same as defined above.

In practicing the present invention the temperature of the reaction mixture may range, for example, from 0° C. to 100° C., and preferably is in the range of 20° C. to 50° C. Ordinarily, the reaction is carried out in a closed reaction vessel under a nitrogen atmosphere. The period of reaction may range, for example, from less than a minute to several hours and preferably is in the range of 10 to 60 minutes. The ratio in parts by weight of catalyst to acetylenic compound to solvent may be in the range of, respectively, 0.1–10:10–500:500–1000 and preferably is about 1:100:1000.

In a typical procedure, the polymerization reaction is carried out as follows: a liquid reaction medium (for example, 750 parts of cyclohexane) and acetylenic compound (for example 82 parts of ethyl propiolate) are placed in a glass reaction vessel and the mixture is purged with nitrogen gas. Catalyst, for example 1 part of Ni(PCl$_3$)$_4$, is charged into the reaction vessel and is dissolved or dispersed in the reaction medium. The reaction is carried out in the range of 20° C. to 80° C., and the duration of reaction is about 1 hour. At the end of this period, the vessel is opened, and the solid or liquid polymer is isolated and purified by conventional methods well known to those skilled in the art, for instance, as described in Example 1.

The yield of polymer obtained in such a typical reaction is about 70% or more based on the initial weight of the monomeric material charged. The yield varies depending, for example, upon the particular liquid reaction medium, the particular monomer employed, the particular catalyst employed, and the other particular conditions of the reaction.

The use of nickel compound described and defined by Formula I as catalysts in polymerization reactions as defined in this specification provides a new method of making homopolymers and copolymers of polymerizable materials comprising one or more acetylenic compounds. These reactions are convenient and may take place at room temperature which makes them extremely easy to adapt to commercial methods. It is unexpected that these reactions take place since other types of monosubstituted acetylene do not react in the presence of the nickel catalysts described in this specification. In addition, these catalyst compounds are easily prepared and are generally stable.

The homopolymer of acetylene described in this invention may be useful as a drying oil. The cyclooctatetraene compounds having four functional groups as shown in Formulae II, III, VII and VIII as well as the tetrasubstituted cyclooctenes and -cyclooctanes produced from these by partial and total hydrogenation of the eight-membered ring and the tetra-carboxylic acids of any of the above compounds as well as other derivatives of any of the aforementioned compounds produced by chemical reactions are all new compounds. They may be useful in the usual way of cyclooctatetraene itself; or, by virtue of the highly substituted ring, may be useful for forming novel cross-linking structures and polymers, especially when the substituents on the ring contain acidic groups or carbon to carbon unsaturation. Further, these tetrasubstituted eight-membered carbocycles may be used in forming novel cyclic polyones, which, upon oxime formation and rearrangement, give novel lactams which are known basic materials in polyamide formation. Chlorination of these cyclooctatetraenes and esterification with the proper functions would give a compound with usefulness as an antioxidant, while the octene or octane compounds described below, when properly esterified, would give compounds of interest in the field of polydentate metal-ion chelation.

It is seen from the examples below that the hydrogenation of the 7-position of the 1,2,4,6-tetrasubstituted isomers of cyclooctatetraene is selective, and that it is possible to make the 7-ene derivatives by stopping the hydrogenation after the 1,3, and 5 positions have been saturated.

Further, all or some of the substituted ester groups may be converted to carboxylic acid groups by controlled hydrolysis of the cyclooctatetraenes, cyclooctenes, said cyclooctanes represented in this specification.

The structures of these novel cyclooctatetraenes, cyclooctenes, and cyclooctanes were determined from infrared, ultraviolet, and nuclear magnetic resonance spectra and by identification of the products of thermal degradation. Spectral analysis discloses the presence of infrared absorption at 1628 and 795 cm.$^{-1}$ as well as a strong ultraviolet band near 2300 Angstroms which are characteristic of cyclooctatetraenes. Proton resonance spectra show the presence of ring hydrogen atoms in the regions characteristic of such substituted carbocycles. Thermal decomposition yields the expected products, namely a substituted benzene and an acetylene. Typical cyclooctatetraene structures are characterized by the rapid uptake of three moles of hydrogen and further slower uptake of the fourth mole as is observed, for example, during the hydrogenation of the 1,2,4,6-isomers. Structural isomers are distinguished on the basis of the nuclear resonance spectra of the parent compounds and their partially and totally hydrogenated analogues. Position and hyperfine splitting of the various resonance bands was sufficient to assign 1,2,4,6- and 1,3,5,7-structures to the two isomers isolated.

It may be pointed out here that the tetracarboxy esters of the cyclooctatetraenes, cyclooctenes, and cyclooctanes disclosed herein may be used as intermediates in the synthesis of a wide variety of tetrasubstituted carbocyclic compounds. To those skilled in the art, it is obvious how to transform any or all of the —COOR groups in the tetrasubstituted cyclooctatetraenes, cyclooctenes, and cyclooctanes disclosed herein to different groups and preserve the ring structure. For example, the alcoholic group —CH$_2$OH may be produced by reduction of —COOR with LiAlH$_4$; the acidic group —COOH by saponification and acidification; the acid halide —COX by action of PCl$_3$ or SOCl$_2$ on the acid; the ketone —COR by action of the reagent RCdX on the acid halide; the amide —CONH$_2$ by action of NH$_3$ on the acid chloride; the group —C≡N by dehydration of the amide; the aldehyde —COH by Rosenmund reduction of the acid halide; the group —NH$_2$ by action of NaOCl on the amide; the group CH$_2$OR by action of the K metal on the group —CH$_2$OH, then treatment of CH$_2$OK with reagent RX; and so on.

The scope of the new compounds prepared by the present invention is represented by the following:

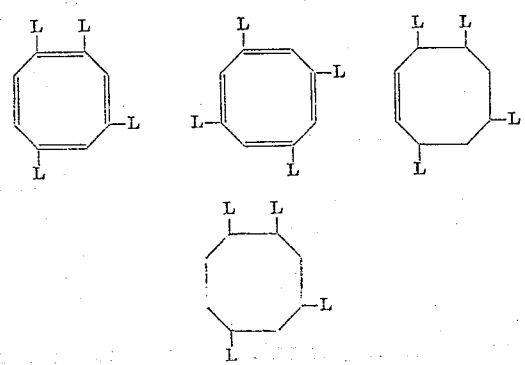

and

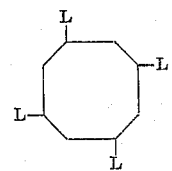

wherein L represents at least one member of the class consisting of —COOR, —COOM, —COX, —CONH$_2$, —CH$_2$OR, and —COR, where R represents a member selected from the class consisting of hydrogen, alkyl, cycloalkyl, aryl, alkaryl, aralkyl, alkenyl and dialkylaminoalkyl radicals; X represents a member selected from the class consisting of F, Cl, Br and I, and M represents members selected from the class consisting of alkali and alkaline earth metals.

In order that those skilled in the art may better understand how the present invention can be carried into effect, the following examples are given by way of illustration, and not by way of limitation. All parts and percentages are by weight unless otherwise stated.

*Example 1.—Polymerization of Acetylene*

A 280 cc. glass-lined autoclave is charged with 0.294 g. Ni(PCl$_3$)$_4$ and 100 cc. of cyclohexane. The autoclave is flushed with nitrogen, closed and set shaking at 25° C. Acetylene gas is run in up to 150 p.s.i.g. and after initial absorption is finally recharged up to 115 p.s.i.g. and sealed. The autoclave is shaken for 4½ hours, after which it is opened and the unreacted catalyst filtered off. The cyclohexane solution is distilled, and there is obtained a yellow oil containing no nickel. The material is shown to have the typical infrared spectrum of a hydrocarbon polymer containing ethylenic and acetylenic unsaturations, namely absorption bands (in cm.$^{-1}$) at 3380 (s), 1635 and 1665 (m) doublet, 1175 (m) and 1025 (s).

*Example 2.—Polymerization of Allene*

A 280 cc. glass-lined autoclave is charged with 1.00 g. Ni(PCl$_3$)$_4$ and 100 cc. of cyclohexane. The autoclave is flushed with nitrogen, closed and set shaking at 22° C. Allene gas (14½ grams, pre-purified by fractional distillation in vacuum to remove acetylenes) is distilled in at −78° C. The autoclave is sealed and shaken for 4 hours, then the temperature is raised to 80° and held there for 5 hours. After this period the autoclave is opened, the decomposed catalyst filtered off, and the solution is distilled in a high vacuum. Two fractions are obtained, a more volatile one consisting of a yellow oil and a less volatile one consisting of a darker viscous mass. The total weight of these products is 3.5 g., or 24% yield based on allene. The infrared spectra of both fractions are essentially the same and are identical with the spectra of 1,2,4 and 1,3,5 trimethylene cyclohexane and 1,3,5,7-tetramethylene cyclooctane, with absorptions (in cm.$^{-1}$) at 3080, 2990, 2920 (CH); 1640 cm.$^{-1}$( C=C unconjugated); 1430, 1040, and 975, and 893 cm.$^{-1}$(CH$_2$=exo).

*Example 3.—Polymerization of Ethyl Propiolate*

To 21.29 g. ethyl propiolate in 250 cc. cyclohexane is added 0.26 g. Ni(PCl$_3$)$_4$ at 18° C. with N$_2$ bubbling. A 53° exotherm occurred in 10 minutes and 70% of the ethyl propiolate disappeared according to infrared analysis. The brown reaction solution is filtered, the solvent and unreacted acetylene are removed, and the resulting viscous material is recrystallized from hot absolute ethanol. Two crystalline products are obtained which are separated on filtration. 3.15 g. of 1,2,4,6-tetracarbethoxycyclooctatetraene are obtained as yellow crystals, melting point 83.5–84° C.

*Analysis.*—Calc'd for C$_{20}$H$_{24}$O$_8$: C, 61.22; H, 6.17; O, 32.61; M.W. 392. Found: C, 61.3; H, 6.45; O, 33.09; M.W. 390.

0.19 g. of 1,3,5,7-tetracarbethoxycyclooctatetraene were obtained as pale yellow crystals, melting point 130.5–131° C.

*Analysis.*—Calc'd for $C_{20}H_{24}O_8$: C, 61.22; H, 6.17. Found: C, 60.99; H, 6.95.

The remaining viscous product was identified as primarily a mixture of 1,2,4- and 1,3,5-tricarbethoxybenzenes.

*Example 4.—Polymerization of Methyl Propiolate*

Same as (3) except that methyl propiolate is used. To 4.53 g. methyl propiolate in 60 cc. cyclohexane is added 0.0323 g. $Ni(PCl_3)_4$ at 22° C. with $N_2$ bubbling. A 33° exotherm occurred in 10 minutes and 67% of the acetylene disappeared according to infrared analysis. An additional 0.129 g. $Ni(PCl_3)_4$ is added, causing a 10° exotherm and an additional 25% reaction. The reaction solution is filtered, giving a clear yellow filtrate and brown solid. Solvent is removed from the filtrate, leaving a viscous yellow liquid identified as 1,2,4-tricarbmethoxybenzene. The brown solid is recrystallized from hot absolute ethanol to give 1.1 g. of 1,2,4,6-tetracarbmethoxycyclooctatetraene as cream-colored crystals, melting point 182.5–183° C.

*Analysis.*—Calc'd for $C_{16}H_{16}O_4$: C, 57.14; H, 4.79. Found: C, 57.26; H, 5.01.

*Example 5.—Copolymerization of Ethyl and Methyl Propiolates*

To 2.65 g. ethyl propiolate and 2.27 g. methyl propiolate in 55 cc. cyclohexane is added 0.073 g. $Ni(PF_3)_4$ at room temperature with $N_2$ bubbling. A 42° exotherm occurred after a 15-minute induction period and 89% of the propiolates disappeared according to infrared analysis. The reaction solution is filtered, giving a yellow filtrate and brown solid. Solvent is removed from the filtrate, leaving a viscous yellow oil identified as a mixture of all possible tetramer and trimer products. The brown solid is recrystallized from absolute ethanol to give monocarbethoxy-tricarbmethoxycyclooctatrene as white crystals, melting point 145° C.

*Analysis.*—Calc'd for $C_{17}H_{18}O_8$: C, 58.28; H, 5.18. Found: C, 58.26; H, 4.90.

*Example 6*

To 4.5 g. phenyl propiolate in 45 cc. cyclohexane is added 0.031 g. $Ni[As(C_6H_5)Cl_2]_4$ at room temperature with nitrogen bubbling. After one hour of stirring at autogenous temperatures, the solvent and unreacted propiolate monomer are removed from the reaction solution by evaporation. Infrared analysis of the residue showed, as in the above examples, absorptions at 800 and 1625 cm.$^{-1}$.

*Example 7*

To 4.5 g. vinyl propiolate in 45 cc. cyclohexane is added 0.055 g. $Ni[SbCh_3Br_2]_4$ at room temperature. After one hour of stirring, the solution is worked up as in the above example, and cyclic polymerization products of the propiolate monomer are detected by infrared spectral analysis of the residue.

*Example 8*

To 4.5 g. N,N-diethylamine-methyl propiolate in 45° C. cyclohexane is added 0.044 g.

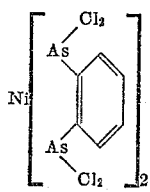

at room temperature. After 30 minutes of stirring, the solution is worked up as in the above example, and cyclic polymerization products of the propiolate monomer are detected by infrared spectral analysis and chemical identification of the N,N-dialkyl groups in the residue.

*Example 9.—Hydrogenation*

Hydrogenation of a solution of 0.1927 g. 1,2,4,6-tetracarbethoxycyclooctatetraene in 52 cc. cyclohexane in the presence of 0.1 g. 5% Pd on charcoal catalyst at atmospheric pressure and 25° C. is complete in 45 minutes after the absorption of 0.00275 g. $H_2$ (93% of 0.00296 g. $H_2$ theory). The reaction solution is filtered and solvent is removed. Colorless, viscous 1,2,4,6-tetracarbethoxycyclooct-7-ene remains, boiling point 185° C./0.1 mm., $N_D^{25}=1.479$.

*Analysis.*—Calcd. for $C_{20}H_{30}O_8$: C, 60.28; H, 7.59. Found: C, 60.15; H, 7.35.

*Example 10.—Hydrogenation*

Hydrogenation of a solution of 0.0480 g. 1,2,4,6-tetracarbethoxycyclooctatetraene in 62 cc. cyclohexane in the presence of 0.1 g. 5% Pd on charcoal catalyst at atmospheric pressure and 25° C. is complete in 66 hours after the absorption of 0.00101 g. $H_2$ (103% of 0.000985 g. $H_2$ theory). The reaction solution is filtered and solvent is removed. Colorless, viscous 1,2,4,6-tetracarbethoxycyclooctane remains, boiling point 163° C./0.25 mm., $n_D^{25}=1.467$.

*Analysis.*—Calcd. for $C_{20}H_{32}O_8$: C, 59.98; H, 8.06. Found: C, 59.67; H, 8.07.

*Example 11.—Hydrogenation*

Hydrogenation of a solution of 0.0111 g. 1,3,5,7-tetracarbethoxycyclooctatetraene in 18.5 cc. cyclohexane in the presence of 0.1 g. 5% Pd on charcoal catalyst at atmospheric pressure and 25° C. is complete in 10 minutes after the absorption of 0.000215 g. $H_2$ (93.5% of 0.000225 g. $H_2$ theory). The reaction solution is filtered and solvent is removed; colorless, viscous 1,3,5,7-tetracarbethoxycyclooctane remains.

*Example 12.—Saponification*

1,2,4,6-tetracarbethoxycyclooctatetraene, 0.2873 g., is saponified by refluxing in 25 cc. absolute ethanol containing 1.25 g. KOH for one hour. The ester absorbed 0.166 g. KOH (102% of 0.162 g. KOH theory). The solution is cooled and acidified with HCl to pH 1.5. Solvent is removed and the resulting solids are extracted with diethyl ether. The solid obtained on evaporation of the ether is recrystallized from ether to yield cyclooctatetraene-1,2,4,6-tetracarboxylic acid as yellow plates, melting point 267–268° C. (dec.).

*Example 13.—Saponification*

1,3,5,7-tetracarbethoxycyclooctatetraene, 0.015 g., is saponified by refluxing in 25 cc. absolute ethanol containing 0.1 g. KOH for one hour. The solution is cooled and acidified with HCl to pH 1.5. The ester absorbed 0.0352 g. KOH (95% of 0.0855 g. KOH theory). Solvent is removed and the resulting solids are extracted with diethyl ether. Evaporation of the ether gave cyclooctatetraene-1,3,5,7-tetracarboxylic acid as pale yellow crystals, melting point 235–237° C. (dec.).

*Example 14.—Saponification*

1,2,4,6-tetracarbmethoxycyclooct-7-ene, 0.0968 g., is saponified by refluxing in 10 ml. ethanol containing 0.33 g. KOH for one hour. The ester absorbed 0.0575 g. KOH (91% of 0.0635 g. KOH theory). The solution is cooled and acidified with HCl to pH 1.5. Solvent is removed and the resulting solids are extracted with diethyl ether. Evaporation of the ether gave cyclooct-7-ene-1,2,4,6-tetracarboxylic acid as pale yellow crystals, melting point 120–123° C.

Example 15.—Saponification 1,2,4,6-tetracarbmethoxycyclooctane, 0.1106 g., is saponified by refluxing in 10 ml. ethanol containing 0.33 g. KOH for one hour. The ester absorbed 0.0710 g. KOH (99% of 0.0717 g. KOH theory). The solution is cooled and acidified with HCl to pH 1.5. Solvent is removed and the resulting solids are extracted with diethyl ether. Evaporation of the ether gave cyclooctane-1,2,4,6-tetracarboxylic acid as white crystals which form an anhydride at 90° C. before melting.

We claim:

1. Compounds represented by the general formula selected from the class consisting of

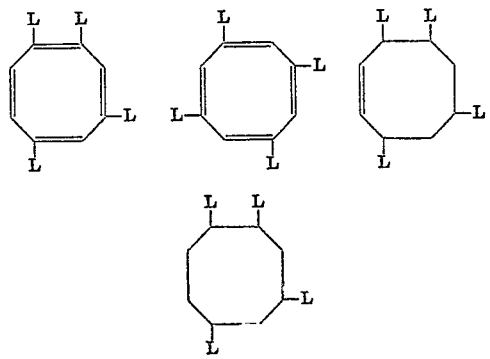

and

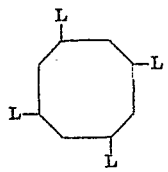

wherein L represents at least one member of the class consisting of —COOR, —COOM, —COX, —CONH$_2$, —CH$_2$OR, and —COR, wherein Re represents a member selected from the class consisting of hydrogen, alkyl of 1 to 10 carbon atoms, phenyl, naphthyl, tolyl, benzyl, cyclopentyl, cyclohexyl, cycloheptyl, vinyl, isopropenyl, allyl, phenylethyl, phenylpropyl, phenylnaphthyl, xylyl, ethylphenyl, methylnaphthyl, dimethylnaphthyl, dimethyl-aminomethyl, diethylaminomethyl, dimethylaminoethyl, and dietylaminoethyl; X represents a member selected from the class consisting of fluorine, chlorine, bromine and iodine, and M represents members selected from the class consisting of alkali and alkaline earth metals.

2. 1,2,4,6-tetracarbmethoxycyclooctatetraene.
3. 1,3,5,7-tetracarbethoxycyclooctatetraene.
4. 1,2,4,6-tetracarbethoxycyclooct-7-ene.
5. 1,2,4,6-tetracarbethoxycyclooctane.
6. A method of polymerizing a polymerizable material selected from the group consisting of acetylene, allene and compounds represented by the formula:

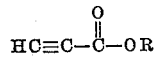

wherein R represents a member selected from the group consisting of an alkyl of from 1 to 10 carbon atoms, phenyl, naphthyl, tolyl, benzyl, cyclopentyl, cyclohexyl, cycloheptyl, vinyl, isopropenyl, allyl, phenylethyl, phenylpropyl, phenylnaphthyl, xylyl, ethylphenyl, methylnaphthyl, dimethylnaphthyl, dimethylaminomethyl, diethylaminomethyl, dimethylaminoethyl, and diethylaminoethyl which comprises contacting said material with a tetracoordinated formally zerovalent nickel catalyst selected from the group consisting of those having the formula:

(I) 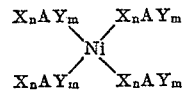

and (II) 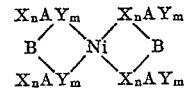

wherein A is a member selected from the group consisting of phosphorous, arsenic and antimony, X is a halogen; Y is a member selected from the group consisting of methyl, ethyl, phenyl, phenoxy, and ethoxy; B is a divalent hydrocarbon radical selected from the group consisting of ethylidene and phenylene; in Formula I each of $m$ and $n$ is a whole number between 0 and 3 inclusive and the sum of $m$ and $n$ is 3; in Formula II, each of $m$ and $n$ is a whole number between 0 and 2 inclusive and the sum of $m$ and $n$ is 2.

7. The method such as set forth in claim 6 wherein the compound to be polymerized is acetylene.
8. The method such as set forth in claim 6 where the compound to be polymerized is allene.
9. The method such as set forth in claim 6 wherein R represents a methyl group.
10. The method such as set forth in claim 6 wherein the catalyst is Ni(PCl$_3$)$_4$.

References Cited in the file of this patent

Reppe: Acetylene Chemistry, P. B. Report 18852-S, translated from German by Chas. A. Meyer and Co., Inc., pages 131–35 (1949).
Cope et al.: J.A.C.S., vol. 73, pages 3536–7 (1951).
Wilkinson: J.A.C.S., vol. 73, pages 5501–2 (1951)
Cope et al.: J.A.C.S., vol. 74, pages 5136–39 (1952).

UNITED STATES PATENT OFFICE
CERTIFICATE OF CORRECTION

Patent No. 3,076,016 January 29, 1963

Joseph R. Leto et al.

It is hereby certified that error appears in the above numbered patent requiring correction and that the said Letters Patent should read as corrected below.

Column 9, line 40, for "Re" read -- R --.

Signed and sealed this 28th day of January 1964.

(SEAL)
Attest:
ERNEST W. SWIDER
Attesting Officer

EDWIN L. REYNOLDS
Acting Commissioner of Patents